United States Patent
Lingham

(10) Patent No.: US 6,356,876 B1
(45) Date of Patent: Mar. 12, 2002

(54) SYSTEM AND METHOD FOR PROVIDING PRIZE AWARD RESULTS

(75) Inventor: Shankar Lingham, Paramus, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/298,033

(22) Filed: Apr. 22, 1999

(51) Int. Cl.⁷ .............................. G06F 17/60
(52) U.S. Cl. ........................................ 705/14
(58) Field of Search .......................... 705/14

(56) References Cited

U.S. PATENT DOCUMENTS 5,557,658 A * 9/1996 Gregorek et al. ........ 379/88.25
5,697,844 A * 12/1997 Von Kohorn ................ 463/40

FOREIGN PATENT DOCUMENTS

JP          10108974 A    *  4/1998

OTHER PUBLICATIONS

Blalock, Cecilia "Making the right call (prepaid phone programs)", Grocery Headquarters, v. 63, No. 5, May 1997:102 (3).*

* cited by examiner

Primary Examiner—Eric W. Stamber
Assistant Examiner—Donald L. Champagne
(74) Attorney, Agent, or Firm—Oliff & Berridge, PLC

(57) ABSTRACT

The invention is a method and system for reporting the results of a contest to a calling terminal. After receiving terminal and caller information (steps 602 and 604) and determining if the caller is a winner (steps 606 and 608), a customized menu is presented to the caller (steps 618 and 620), where the menu is based on at least one of (1) the services to which the calling terminal subscribes; (2) products associated with the calling terminal; and (3) personal information about the user. The information provided to the caller is a selection of advertisements for products and services of particular interest to the caller.

17 Claims, 6 Drawing Sheets

| TERMINAL ID | NAME | AGE | INCOME | NO. OF PRIOR WINS | SUBSCRIPTIONS | SUBSCRIPTION CODES | |
|---|---|---|---|---|---|---|---|
| 908-555-1234 | JONES | 35 | 100,000 | 2 | VOICE MAIL PAGER CALL WAITING | D2 D4 A1 | |
| 908-555-4321 | SMITH | 27 | 42,000 | 1 | CALL WAITING CALLER ID CALL WAITING, CALLER ID | A1 B2 B3 | |
| . . . . . . | | | | | | | |

| TERMINAL ID | CONTEST ID |
|---|---|
| 703 – 555 – 1234 | 102, 112 |
| ... | ... |

402 — TERMINAL ID
404 — CONTEST ID
400

*FIG. 4*

SYSTEM AND METHOD FOR PROVIDING PRIZE AWARD RESULTS

BACKGROUND OF THE INVENTION

1. Field of Invention

The invention relates to dissemination of information regarding the results of a contest in conjunction with advertisements that are selectively presented based on caller information.

2. Description of Related Art

Currently, in the field of long distance communication there exists a large amount of competition for consumers between long distance service providers. Recently, long distance service providers have begun to promote telephone contests where callers using a particular long distance carrier are automatically entered into the contest to win a prize. In order for contestant callers to determine whether they have won a contest, they can log-on to a web-site and check to see if their names appear in a database of winners. This procedure provides opportunity for introducing new technology to further attract callers.

SUMMARY OF THE INVENTION

The invention provides a prize reporting device and method for reporting the results of a contest to a caller. A contest includes any type of prize awarding scheme, such as sweepstakes, raffles, lottery or the like. Upon inquiry by a caller over a network, the prize reporting device retrieves the results of a contest from a prize database. The prize reporting device informs the caller if he/she has won, and further outputs information to the caller based upon the caller's information and whether the caller is a contest winner.

The information provided to the caller is a customized selection of advertisements for products and services which are selected to be of particular interest to the caller based upon the caller's information. Additionally, the contest reporting device can present a caller with a branching message system, whereby the caller may navigate through a customized menu of choices.

BRIEF DESCRIPTION OF THE DRAWINGS

The invention will be described with reference to the accompanying drawings, in which like elements are referred to with like numbers, and in which:

FIG. 4 is an exemplary data structure for storing terminal and corresponding contest IDs, respectively;

DETAILED DESCRIPTION OF PREFERRED EMBODIMENTS

Figure 1:
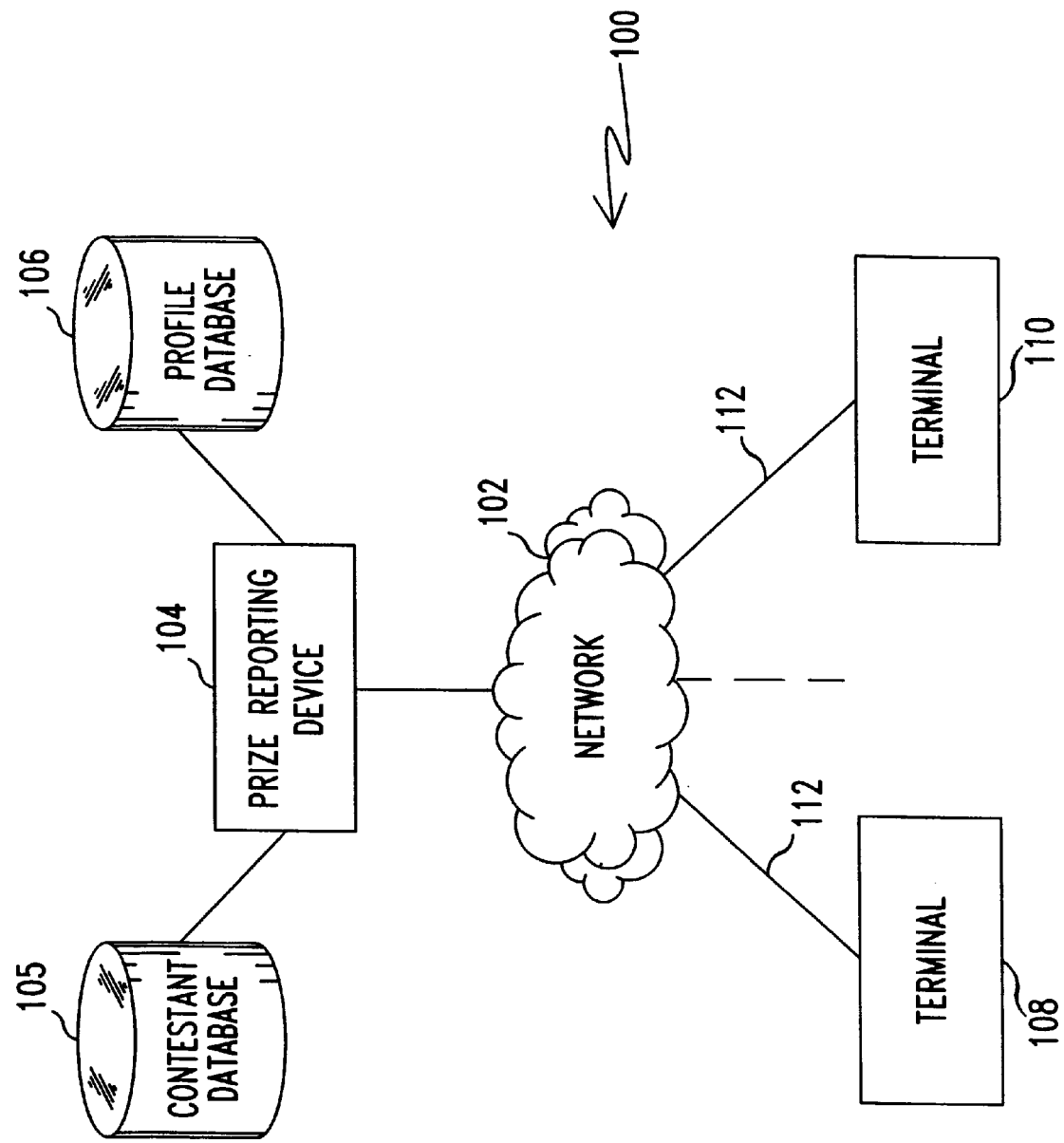
FIG. 1 is a block diagram of an exemplary contest reporting system.

FIG. 1 shows a communication system 100 that includes a network 102, a prize reporting device 104 coupled to the network 102, a profile database 106 and a contestant database 105 that are further connected with the prize reporting device 104. A plurality of terminals 108, 110 are connected with the network 102 via communication links 112. The prize reporting device 104 may report to a calling terminal 108, 110 the results of a contest. A contest includes any type of prize awarding scheme, such as sweepstakes, raffle, lottery or the like. The prize reporting device 104 further outputs customized information to the caller based upon calling terminal information obtained by the prize reporting device 104.

The terminals 108 and 110 may be devices of any type that allow for the transmission and/or reception of communication signals. For example, the terminals 108 and 110 may be land-line telephones, cellular telephones, computers, personal digital assistants, video telephones, video conference apparatuses, smart or computer assisted televisions, and the like. For purposes of the following description of the present invention, it will be assumed that the terminals 108 and 110 are telephones.

The terminals 108 and 110 are in communication with the network 102 through communications links 112. These communications links 112 may be any type of connection that allows the transmission of information. Some examples include conventional telephone lines, fiber optic lines, direct serial or parallel connections, cellular telephone connections, satellite communication links, local area networks (LANs), intranets, and the like.

The communication signals are received by the network 102 and are routed in the network 102, by way of, for example, routers and switches (not shown) to a destination terminal for receiving the communication signals. The routing may be performed by switches such as Lucent Technologies Inc. 5ESS and 4ESS switches, for example, which are generally known it the art.

The network 102 may be a single network or a plurality of networks of the same or different types. For example, the network 102 may include a local telephone network (such as a Bell Atlantic telephone network) in connection with a long distance network (such as an AT&T long distance telephone network). Further, the network 102 may be a data network or a telecommunications network in connection with a data network. Any combination of telecommunications and type of data network may be used without departing from the spirit and scope of the present invention. For purposes of discussion, it will be assumed that the network 102 is a single telecommunications network.

The contestant database 105 contains information corresponding to each terminal using the network 102. Specifically, contestant database 105 will keep track of the contests in which each terminal participates, and whether that terminal 108, 110 has won any of the respective contests.

The profile database 106 contains information corresponding to each terminal 108, 110 using network 102. More particularly, profile database 106 can contain the annual salary, marital status, number of children, and other types of like information on users of the calling terminals 108, 110. The information contained in the profile database 106 can be acquired from the calling terminal 108, 110 while calling the prize reporting device 104 by prompting the caller to answer a series of questions, or it may include information that has been previously collected by surveys, questionnaires, warranty cards, or the like.

Prior to calling the prize reporting device 104, it is assumed that the calling terminal has entered a contest. The calling terminal may have entered a contest by making use of a dial-around service, using directory assistance, calling a specific number and entering contest entry information, calling cards numbers, credit card numbers, and the like. Any known manner of entering a sweepstakes using the network 102 may be used without departing from the spirit and scope of the present invention.

For example, when the calling terminal uses a service that is conducting a sweepstakes, such as a dial-around service (10-10-345) or the like, identification information for the calling terminal and/or calling party is obtained from, for example, header information, such as automatic number identification (ANI) information, in the communication signals sent by the calling terminal. This information is then stored in the contestant database 105 in correspondence with the particular sweepstakes entered. Thus, the contestant database 105 may contain information for multiple on-going sweepstakes or contests.

When the prize reporting device 104 receives a call from terminal 108, for example, over communication network 102, the prize reporting device 104 begins an initial gathering of caller information. The caller information can be gathered from, for example, header information of the communication signals sent from the terminal 108. Alternatively, caller information can be gathered by prompting a caller to enter information in response to a series of questions. The caller information may include a terminal ID, telephone number, mobile identification number (MIN), and the like. Based on the collected caller information, the prize reporting device 104 retrieves profile information from profile database 106.

A caller may be determined to be a winner of the contest in any known manner. For example, the callers may be entered into the contest each time he uses a dial-around service. In this example, the dial-around service provider compiles a listing of terminal ID's of users of the dial-around service for a predetermined time interval. From the listing, the dial-around service provider may randomly select a winner or multiple winning terminal IDs. The list may then be updated to reflect the winning status of the chosen terminal IDs or a separate list of winning terminal ID may be generated and stored.

If the caller is determined to be a winner, the prize reporting device 104 notifies the caller and subsequently proceeds to offer the winning caller options which are based upon the caller's winning status and caller information. If the caller is determined to be a non-winner, the prize reporting device 104 notifies the caller accordingly and proceeds to offer the losing caller options which are based upon the caller's non-winning status and caller information.

The options may be presented to the calling terminal in the form of a customized menu from which the caller may select an option to listen to and/or interact with. The customized menu options may include various advertisements, information, product and/or service descriptions, joint product promotions and the like.

The customized menu options may include the ability to interact with the advertisement, information, product descriptions, etc. The customized menu options may further provide the ability to launch a communication with a representative or sponsor associated with the particular advertisement, product, service, etc. The menu may have multiple levels that may be traversed by the caller by entering appropriate selections via an interface associated with the calling terminal. For example, a caller may choose an option "Telephone Services" and then choose a sub-option "Call Waiting" or "Voice Mail".

The customized menu options presented to the calling terminal are based on the winning status of the calling terminal and the profile information associated with the calling terminal. Alternatively, the customized menu options may be specialized to the particular user of the calling terminal through entry of an appropriate identifier by the user and subsequent retrieval of corresponding profile information and determination of the winning status of the user.

Figure 2:
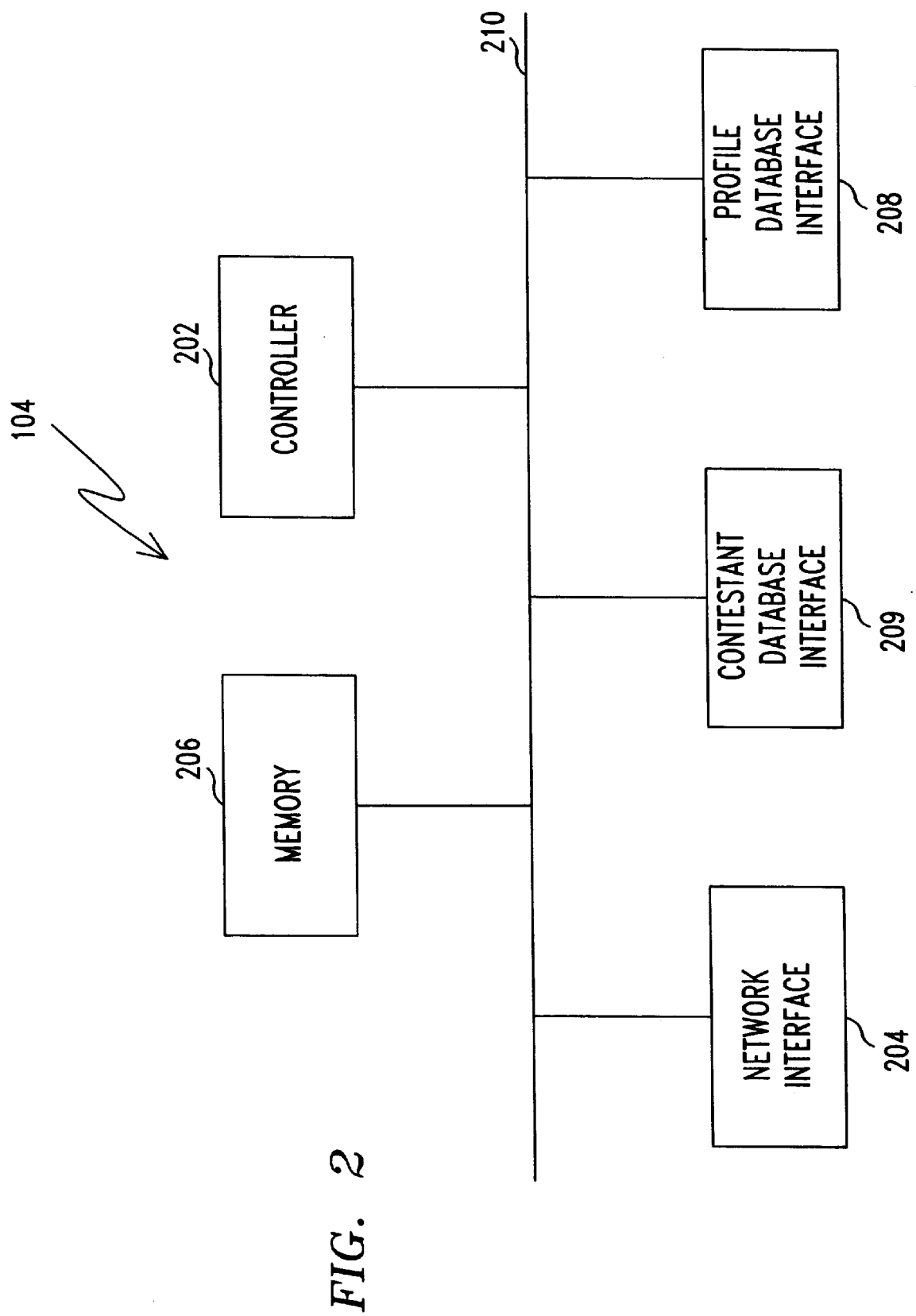
FIG. 2 is a block diagram of the contest reporting device.

FIG. 2 is an exemplary block diagram of the prize reporting device 104. The prize reporting device 104 may include a controller 202, a network interface 204, a memory 206, a profile database interface 208, and a contestant database interface 209. The above components are coupled together via a control/data bus 210. The above architecture is exemplary only. Other architectures of the components may be used without departing from the spirit and scope of the present invention.

The network interface 204 is coupled to the communication network 102 and receives communication signals from terminals 108, 110. When a communication signal is received by the prize reporting device 104 via the network interface 204, the controller 202 may read caller information from a header of the communication signal. Such caller information may include the billed telephone number (BTN), terminal ID, terminal location, and the like. Alternatively, the prize reporting device 104 may actively solicit information from the caller by requiring them to respond to a series of questions. The caller's input can be entered by various means, such as a telephone keypad, voice recognition system, pointer device, and the like.

The controller 202 stores the caller information in memory 206 and retrieves profile information from the profile database 106 through profile database interface 208 based on the caller information. If profile information for the particular calling terminal or caller does not exist in the profile database 106, a default condition is set or the calling terminal is requested to enter appropriate information that is then stored in the profile database 106. The controller 202 then searches the information stored in the contestant database 105, via the contestant database interface 209, to determine if the calling terminal or caller is a winner of a contest. This may be done by retrieving lists of winning terminal IDs or caller identifications and comparing the identification of the calling terminal of the caller with the retrieved lists. If the calling terminal ID or caller identification is in one of the lists, the calling terminal or caller is determined to be a winner.

If the calling terminal or caller is a winner, the controller 202 generates a winner menu that is based on the caller information. The menu may include information on prize selection and how a caller may proceed in order to claim their prize. Additionally, the menu can present the winning caller with options for trading in their prize to receive certain discounts on other more costly products and services. If the caller is a non-winner, the controller 202 generates a non-winner menu that is also based on the caller information.

Both menus are customized based on the caller information and a menu options table described below in FIG. 3. For example, if it is determined from the caller information that the caller subscribes to a voice mail service of a competing phone service provider, one of the options presented to the caller may be information on voice mail services that are less expensive than that of the competitor's. In another example, if it is determined from the caller information that there are numerous phone users at the caller's residence and the caller currently subscribes to only a single phone line, one of the options presented to the caller would be information pertaining to extra home phone lines. Accordingly, the non-winner menu may be the same as the winner menu, except that the awarding of a prize and the ability to trade in the prize for discounts on other products and services is omitted.

Figure 3:
FIG. 3 is an exemplary data structure for storing caller information corresponding to a particular terminal.

FIGS. 3 and 4 show exemplary data structures 300 and 400 for storing data corresponding to caller information, terminal IDs, and contest IDs. It should be understood that there exist numerous methods for storing and organizing such information. For example, the data structures 300 and 400 may be combined into one data structure. Accordingly, the following example should not be understood to be limiting in any way.

FIG. 3 shows an exemplary data structure 300 for storing caller information. The data structure 300 includes field 302 for storing terminal IDs that are used to identify each terminal connected with the communication network 102. The terminal ID 302 can be the telephone number of the terminal, terminal number, mobile identification number, and the like. Alternatively, the terminal ID may be an ID for a particular user of the terminal.

Data structure 300 further includes fields 304–314 for storing the caller information corresponding to the terminal IDs stored in field 302. Fields 304, 306 and 308 correspond to the stored name, age and the income of the terminal user or the household to which the terminal belongs. As described earlier, this information can be collected earlier such as through surveys, questionnaires, warranty cards, or the like and stored in a data structure similar to data structure 300. Field 310 contains the number of prior wins which the terminal has experienced. In field 312 there is stored the various subscriptions to which the terminal currently subscribes. Data structure 300 also includes a subscription code field 314 that stores codes corresponding to the types of subscriptions to which the terminal ID subscribes. As will be described in greater detail below, the subscription codes are used to generate the customized menus.

In the example shown in FIG. 3, terminal ID number 908-555-1234 is registered to Jones who is 35 years in age, and has an annual household income of $100,000. Mr. Jones has won two prior contests and subscribes to voice mail, paging, and call waiting services.

Furthermore, Mr. Jones' subscriptions correspond to subscription codes D2, D4, and A1. Accordingly, as described above, the controller 202 would use the caller information stored in data structure 300 to generate a customized menu of options for presentation to a caller. It should be noted that the fields of the data structure 300 shown in FIG. 3 are not exhaustive and additional fields may be added or deleted as necessary.

FIG. 4 shows an exemplary data structure 400 for storing terminal IDs and contest IDs. Database 105 allows controller 202 to determine if a particular terminal ID 402 is participating in multiple contests simultaneously. By way of example, terminal ID 402 number 703-555-1234 is currently entered in two contests, numbers 102 and 112. Therefore, Table 400 enables the controller 202 to determine if the caller has won a particular contest and subsequently outputs information to the caller which corresponds to the contest, or contests, which the caller is inquiring about.

Figure 5:
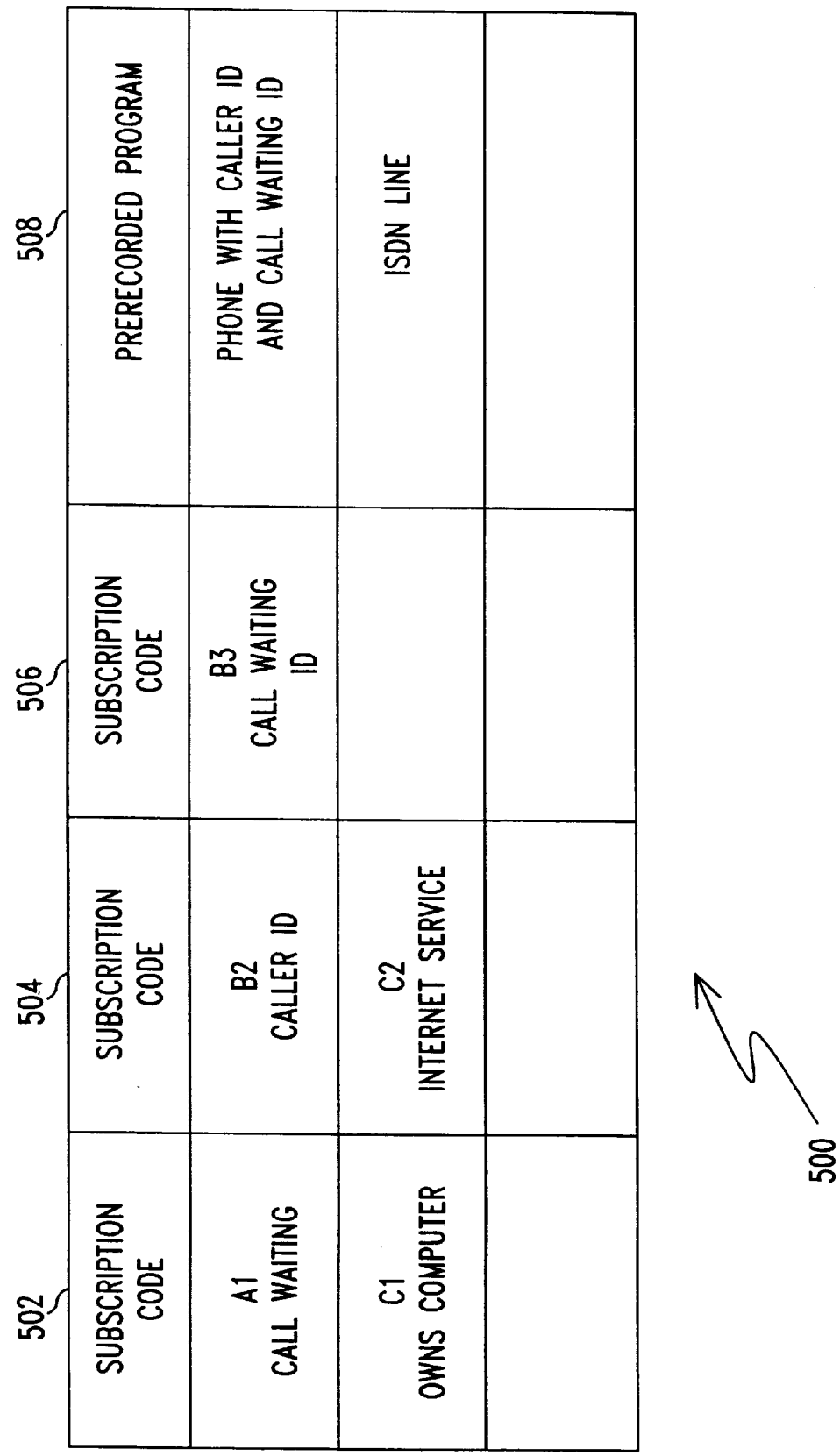
FIG. 5 is an exemplary data structure for storing customized menu selections corresponding to subscription code combinations.

FIG. 5 shows an exemplary menu options data structure 500. Fields 502–506 contain the subscription codes which correspond to the subscription code field 314 of the caller information in data structure 300. Field 508 contains the prerecorded program associated with the corresponding combination of subscription codes.

For example, in FIG. 3 the subscription codes for the terminal having the terminal ID 706-555-4321 are A1 (call waiting), B2 (caller ID), and B3 (call waiting/caller ID). The controller 202 stores the subscription code for the terminal and then matches the particular combination of subscription codes to select a set of prerecorded programs. As shown in FIG. 5, the subscription code A1, B2, and B3 correspond to the phone with caller ID and call waiting ID product. Therefore, one of the selections in the customized menu for that terminal would be information about the phone with caller ID and call waiting ID product.

The prerecorded programs in field 508 can contain information corresponding to any type of subscription codes or combination thereof. For example, a calling terminal having a C1 (owns a computer) in its set of subscription codes could be presented with a prerecorded program relating to sales of a new computer or various computer peripherals. Additionally, if a subscription code or series of codes indicate that the calling terminal has a family and likes to travel, the calling terminal could be presented with a prerecorded program related to sales of airline tickets to various family vacation locations. Thus, the subscription codes are not limited to identifying subscriptions to services but may be any type of identifier of personal information indicating the preferences of a calling party.

It should be understood that not all of the combinations of subscription codes need to be represented in fields 502 through 506 of data structure 500. Various matching algorithms can be employed to match any combination of subscription codes to a closest fit combination that is present in data structure 500. Therefore, if a terminal only subscribed to call waiting (A1), that terminal may still receive information about the phone with caller ID and call waiting ID product. Additionally, the subscription code field 314 can include codes relating to information other than subscriptions. For example in field 502, the subscription code C1 indicates that a particular terminal owns a computer, instead of a subscription to a service.

Figure 6:
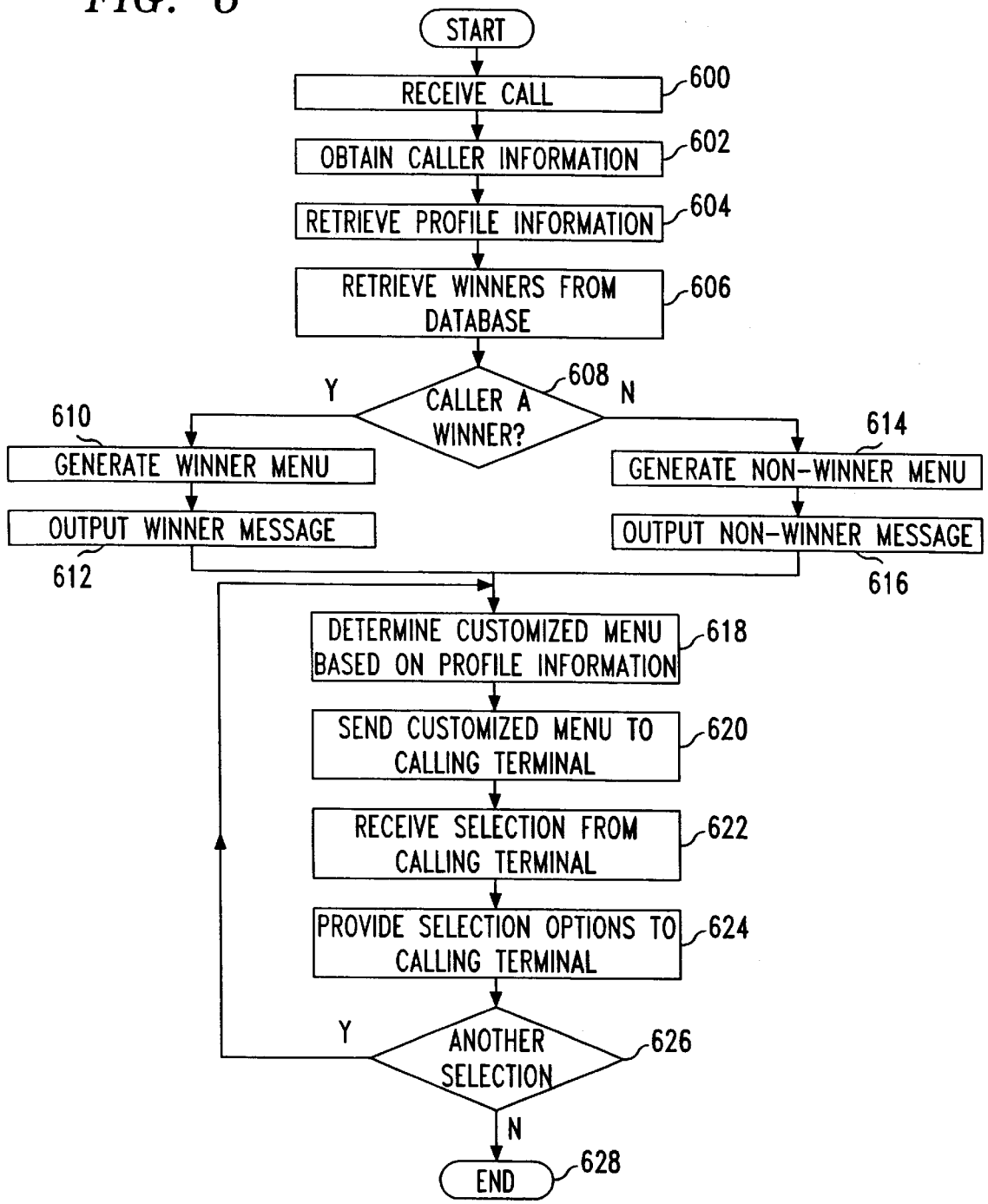
FIG. 6 is an exemplary flowchart outlining one method of reporting contest results according to the present invention.

FIG. 6 shows an exemplary flowchart outlining one method of reporting contest results to incoming calls according to the invention. As shown in FIG. 6, in step 600, the controller 202 receives a call from a caller who is inquiring into whether they have won a contest. Next, the controller 202 proceeds to step 602 where it obtains the caller's information.

The controller 202 goes to step 604 where it retrieves profile information from profile database 106. As described above, this step may be passive, as when the controller 202 accesses profile information already collected and stored in profile database 106 on the caller or use information that is inherent in the terminal ID. Alternatively, this step may be active, as when the controller 202 solicits answers to questions about the caller to collect profile information. Additionally, step 602 may be a combination of both passive and active information gathering techniques.

In step 606, the controller 202 accesses the prize database 105, and determines if the caller is a winner of a sweepstakes based on caller information collected in step 602. In step 608, if the caller is a winner of the sweepstakes, the controller 202 goes to step 610; otherwise, the controller 202 goes to step 614. In step 610, the controller 202 generates a winner's menu based on the caller information and goes to step 612 where the caller is notified of his winning. In step 614, the controller 202 generates a non-winner's menued based on the caller information and goes to step 616 where the caller is notified of his losing.

Subsequent to both steps 612 and 616, the controller 202 goes to step 618. In step 618,the controller 202 generates a customized menu that is based on the profile information, as described above. In step 620 the controller 202 sends the customized menu to the caller.

After the calling terminal receives the customized menue from the controller 202, the calling terminal will select an option of particular interest, and the controller will proceed to step 622. In step 622, the controller receives the selection from the terminal and goes to step 624 where the controller 202 provides the selective option to the calling terminal. After the selected option is complete, in step 626, the controller 202 gives the calling terminal the option of weather to continue the call and receive further options, or terminate the call. If the calling terminal wishes to terminate the call, the controller 202 goes to step 628; otherwise the controller 202 returns to step 618. In step 628 the controller terminates the call and ends the the process.

In steps 618–624, the controller 202 continues to interact with the caller to present them with options regarding certain selected products and services. Preferably, the presentation will allow the caller to navigate through a menu of choices in order to permit the caller to further refine the advertisements for products and services down to a particular area of interest. Navigation can be accomplished by the use of a touch-tone telephone (i.e., press #1, 2, 3, etc.) or voice labels (i.e., by saying 1, 2, 3, 4, etc.). Furthermore, the choices made by the caller during steps 618–624 may be stored as additional caller information for use by the prize reporting device 104 the next time the caller calls.

As shown in FIG. 2, the method of this invention is preferrably implemented on a programmed processor. However, the prize reporting device 104 can also be implemented on a general purpose or special purpose computer, a programmed microprocessor or microcontroller and peripheral integrated circuit elements, an Application Specific Intergrated Circuit (ASIC) or other intergrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIG. 6 can be used to implement the prize reporting device 104 functions of this invention.

While this invention has been described in conjunction with the specific embodiments thereof, it is evident that many alternatives, modifications and variations will be apparent to those skilled in the art. Accordingly, preferred embodiments of the invention as set forth herein are intended to be illustrative not limiting. There are changes that may be made without departing from the spirit and scope of the invention.

What is claimed is:

1. A method for reporting the results of a contest to a calling terminal, comprising:

retrieving the contest results based on calling terminal information, the contest results identifying whether or not the calling terminal is a winning calling terminal;

outputting a customized menu based on the calling terminal information and the contest results;

selecting one or more menu options to be presented to the calling terminal; and presenting the selected one or more menu options to the calling terminal, wherein the one or more menu options are selected based on calling terminal profile information associated with the calling terminal, wherein the calling terminal profile information includes at least one of the services to which the calling terminal subscribes, products associated with the calling terminal, and personal information about a user of the calling terminal.

2. The method of claim 1, wherein outputting a customized menu further comprises:

outputting a winners customized menu if the contest results identify the calling terminal as a winning calling terminal; and outputting a non-winner's customized menu if the contest results identify the calling terminal as a non-wining calling terminal.

3. The method of claim 1, wherein the selected one or more menu options include at least one of advertisements, information on services, and information on products.

4. The method of claim 1, further comprising gathering calling terminal profile information about a user of the calling terminal by prompting the calling terminal to enter the calling terminal profile information and receiving responses to the prompts.

5. The method of claim 1, wherein the calling terminal is at least one of a land-line telephone, cellular telephone, computer, personal digital assistant, video telephone, video conference apparatus, and smart or computer assisted television.

6. The method of claim 1, further comprising:

receiving an election of an option from the one or more selected menu options; and providing the calling terminal with information corresponding to the elected option.

7. The method of claim 1, wherein the customized menu comprises a plurality of levels and wherein the calling terminal navigates through the plurality of levels by sending responses to a series of prompts.

8. The method of claim 7, wherein the calling terminal responds to the series of prompts using at least one of voice recognition and touch-tone telephone responses.

9. An apparatus that reports the results of a contest to a calling terminal, comprising:

a network interface;

a database that contains the results of the contest; and a controller coupled to the network interface and the database, whereby the controller retrieves contest results based on calling terminal information to determine whether the calling terminal is a winning calling terminal and outputs a customized menu based on the calling terminal information and the contest results, and further wherein the controller selects one or more menu options to be presented to the calling terminal, and presents the selected one or more menu options to the calling terminal, and wherein the one or more menu options are selected based on calling terminal profile information associated with the calling terminal wherein the calling terminal profile information includes at least one of services to which the calling terminal subscribes, products associated with the calling terminal, and personal information about a user of the calling terminal.

10. The apparatus of claim 9, wherein the controller outputs a winner's customized menu if the contest results identify the calling terminal as a winning calling terminal and the controller outputs a non-winner's customized menu if the contest results identify the calling terminal as a non-wining calling terminal.

11. The apparatus of claim 9, wherein the selected one or more menu options include at least one of advertisements, information on services, and information on products.

12. The apparatus of claim 9, wherein the controller further gathers calling terminal profile information about the calling terminal by prompting the calling terminal to enter the calling terminal profile information and receiving responses to the prompts.

13. The apparatus of claim 9, wherein the calling terminal is at least one of a land-line telephone, cellular telephone, computer, personal digital assistant, video telephone, video conference apparatus, and smart or computer assisted television.

14. The apparatus of claim 9, wherein the controller receives an election of an option from the one or more selected menu options, and provides the calling terminal with information corresponding to the elected option.

15. The apparatus of claim 9, wherein the customized menu comprises a plurality of levels and wherein the calling terminal navigates through the plurality of levels by sending responses to a series of prompts.

16. The apparatus of claim 15, wherein the calling terminal responds to the series of prompts using at least one of voice recognition and touch-tone telephone responses.

17. A method for reporting the results of a contest to a calling terminal, comprising:
   transmitting the contest results to the calling terminal based on calling terminal information, the contest results identifying whether or not the calling terminal is a winning calling terminal; and
   outputting a customized menu based on the calling terminal profile information and the contest results, wherein the calling terminal profile information includes at least one of the services to which the calling terminal subscribes, products associated with the calling terminal, and personal information about a user of the calling terminal.

* * * * *